US005585641A

United States Patent [19]

Sze et al.

[11] Patent Number: 5,585,641

[45] Date of Patent: Dec. 17, 1996

[54] LARGE AREA, SURFACE DISCHARGE PUMPED, VACUUM ULTRAVIOLET LIGHT SOURCE

[75] Inventors: Robert C. Sze, Santa Fe; Gerard P. Quigley, Los Alamos, both of N.M.

[73] Assignee: The Regents of the University of California, Alameda, Calif.

[21] Appl. No.: 448,242

[22] Filed: May 23, 1995

[51] Int. Cl.$^6$ .................................................. G01N 21/00

[52] U.S. Cl. ...................................... 250/492.1; 250/493.1

[58] Field of Search ............................ 250/492.1, 493.1, 250/504 R; 315/248

[56] References Cited

U.S. PATENT DOCUMENTS

| | | | |
|---|---|---|---|
| 4,945,290 | 7/1990 | Eliasson et al. | 315/246 |
| 5,083,030 | 1/1992 | Stavov | 250/453.1 |
| 5,136,170 | 8/1992 | Gellert | 250/492.1 |
| 5,173,638 | 12/1992 | Eliasson et al. | 313/634 |

OTHER PUBLICATIONS

A. S. Bashkin et al., "High–Power 1 μsec Ultraviolet Radiation Source For Pumping Of Gas Lasers," Sov. J. Quantum Electron. 6, 994–996 (1976).

R. E. Beverly, III et al., "Ultraviolet Spectral Efficiencies Of Surface–Spark Discharges With Emphasis On the Iodine Photodissociation Laser Pumpband," Appl. Optics 16, 1572–1577 (1977).

*Primary Examiner*—Bruce C. Anderson
*Attorney, Agent, or Firm*—Samuel M. Freund

[57] ABSTRACT

Large area, surface discharge pumped, vacuum ultraviolet (VUV) light source. A contamination-free VUV light source having a 225 cm$^2$ emission area in the 240–340 nm region of the electromagnetic spectrum with an average output power in this band of about 2 J/cm$^2$ at a wall-plug efficiency of approximately 5% is described. Only ceramics and metal parts are employed in this surface discharge source. Because of the contamination-free, high photon energy and flux, and short pulse characteristics of the source, it is suitable for semiconductor and flat panel display material processing.

10 Claims, 3 Drawing Sheets

LARGE AREA, SURFACE DISCHARGE PUMPED, VACUUM ULTRAVIOLET LIGHT SOURCE

This invention was made with government support under Contract No. W-7405-ENG-36 awarded by the U.S. Department of Energy to the Regents of the University of California. The government has certain rights in the invention.

FIELD OF THE INVENTION

The present invention relates generally to light sources and, more particularly, to a vacuum ultraviolet light source suitable for processing semiconductor and flat panel display materials.

BACKGROUND OF THE INVENTION

Vacuum ultraviolet (VUV) light sources are attractive for processing optical materials since the high photon energy of such sources permits photochemical bond breaking. This property, plus the relatively short pulse characteristics of these sources, open a variety of semiconductor and flat panel display processing applications. These applications include photo-resist ashing, metal planarization, annealing of amorphous silicon devices to polysilicon devices, such as liquid crystal displays and silicon on insulators, and activation of electroluminescent phosphors. Currently, in the case of annealing, processing is achieved using lasers, the output of which are rastered over the surface to be treated.

Deposition of high energy into a narrow-width surface discharge has been shown to generate copious quantities of ultraviolet radiation by A. S. Bashkin et al. in "High-Power 1 μsec Ultraviolet Radiation Source For Pumping Of Gas Lasers," Sov. J. Quantum Electron. 6, 994–996 (1976). Stored electrical energy as high as 50 kJ was available for pumping gas lasers. Efficient production of ultraviolet radiation from the surface of a dielectric material has also been studied by R. E. Beverly, III et al. in "Ultraviolet Spectral Efficiencies Of Surface-Spark Discharges With Emphasis On The Iodine Photodissociation Laser Pumpband," Appl. Optics 16, 1572–1577 (1977). Electrical conversion efficiencies into the 250–290 nm band of the electromagnetic spectrum were reported to be 4.5% for the optical pumping of the iodine photodissociation laser. Various ceramic dielectric materials and buffer gases were employed in order to characterize the desired ultraviolet radiation output, since it was observed that the output intensity in a given spectral region was strongly dependent upon these parameters. The measurements were performed at relatively low energy (approximately 20 Joules), and little care was taken to insure uniformity of the discharge.

For many semiconductor and flat panel display processing applications, a uniform, large surface area light source is required. Previous research by the present inventors into large-area surface discharges (5 cm×20 cm) for pumping chemical lasers, used a grounded back plane and a Teflon dielectric plate, and generated a ribbon-like plasma having multiple streamers at stored electrical energies of 1.7 kJ. However, in order to use such ultraviolet sources for processing semiconductor materials, fluoro- and chlorocarbons cannot be present since under intense ultraviolet radiation, carbon particles are formed. This is an unacceptable contamination for any semiconductor processing applications. It is also known that large-area dielectric materials are too brittle to withstand the repeated shocks generated by the 2–4 kJ energy pulses desired to be deposited into the surface discharge.

Accordingly, it is an object of the present invention to provide an ultraviolet light source uniform over a large area which is suitable for processing contamination-sensitive materials, and which does not generate significant quantities of ions which may damage the materials.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the large-area, surface discharge light source of the present invention may include in combination: a substantially flat, conducting back plate having at least one straight edge; a flat dielectric plate having two substantially flat and parallel sides, one side placed in contact with the back plate; an elongated ground electrode, in electrical contact with the back plate, located on the side of the dielectric plate away from the back plate, and having its long dimension substantially parallel to a straight edge of the back plate; an elongated high-voltage electrode located on the same side of the dielectric plate as the ground electrode and spaced apart therefrom, with its long dimension parallel to the long dimension of the ground electrode; means for pressing the ground electrode against the surface of the dielectric plate, and means for pressing the high-voltage electrode against the surface of the dielectric plate such that the dielectric plate is pressed against the back plate and is free to slide in all directions along the back plate away from the straight edge thereof; means for applying a high-voltage pulse to the high voltage electrode; and an air-tight enclosure for permitting a chosen pressure of a chosen gas to be maintained in the region of the surface of the dielectric plate between the ground electrode and the high-voltage electrode.

Benefits and advantages of the present invention include the ability to photolytically process materials with a uniform, contamination-free large area light source without the requirement of an intervening optical window.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Briefly, the present invention includes a 15 cm×15 cm, uniform (about 5%) surface discharge ultraviolet light source. The discharge is controlled using a dielectric sheet in contact with a flat, grounded back plane. The dielectric sheet is held in place by pressure from an elongated grounded electrode and a spaced-apart, parallel, elongated high-voltage electrode on the surface thereof away from the back plane. This permits unencumbered expansion of the dielectric plate insuring that brittle materials such as alumina ($Al_2O_3$) and glass ($SiO_2$), to identify two examples, can be employed without breakage even at energies in the region of 2 kJ. Since fluoro- and chlorocarbon materials and other materials containing carbon cannot be utilized for processing semiconductor materials, because of the formation of free carbon under the intense ultraviolet radiation, "clean" dielectrics must be employed if the material is to be in the same chamber with the light source.

Figure 1:
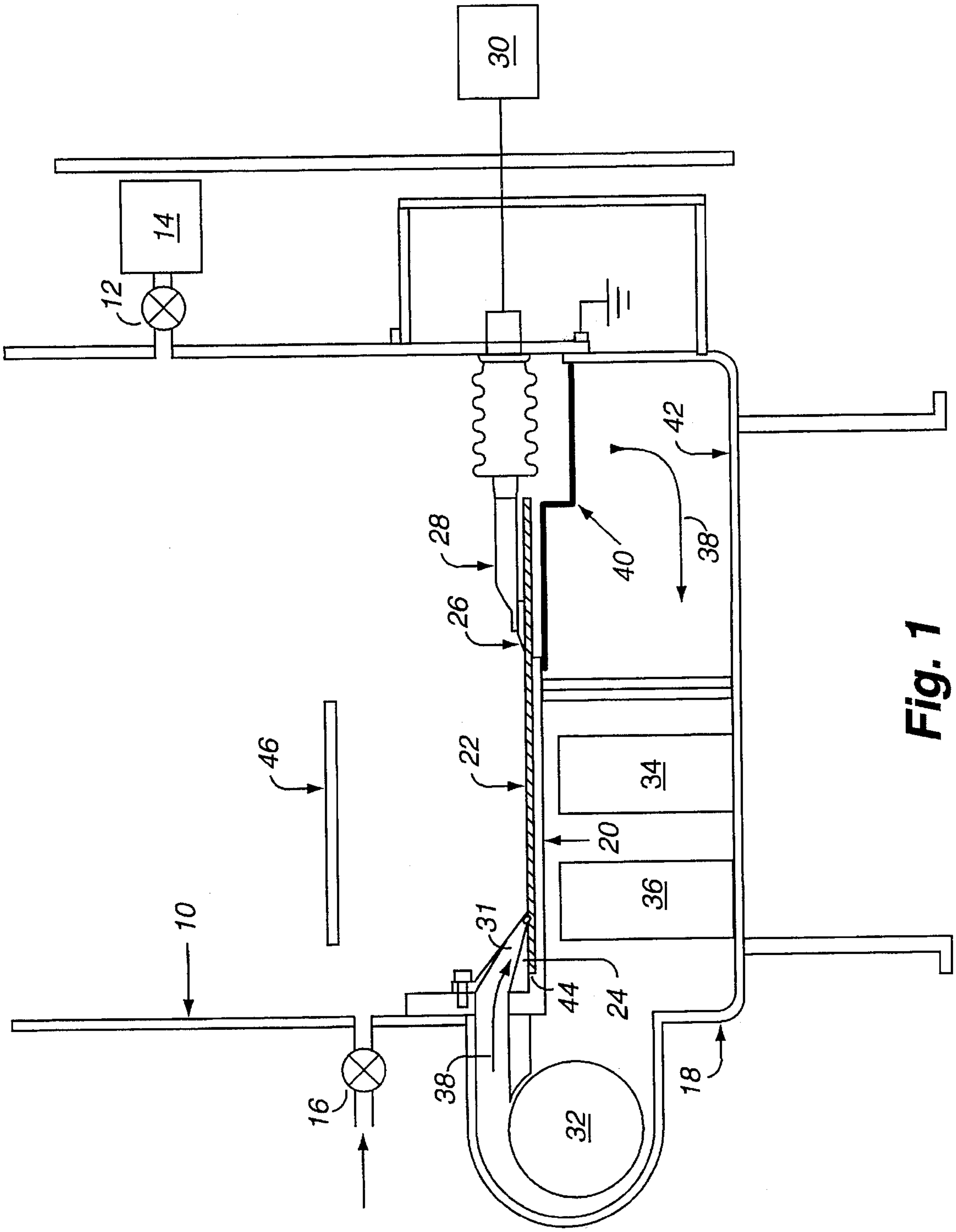
FIG. 1 is a schematic representation of a side view of a reactor containing the surface discharge light source of the present invention, for processing materials.

Reference will now be made in detail to the present preferred embodiments of the invention, examples of which are illustrated in the accompanying drawings. Identical or similar structure is identified by identical callouts. Turning now to FIG. 1, a side view of a reactor for processing materials containing the surface discharge light source of the present invention is schematically illustrated. Vacuum-tight enclosure, 10, is evacuated through valve, 12, by means of pump, 14. Valve, 16, permits the filling of enclosure, 10, with chosen gases to a chosen pressure. The principal components of surface discharge source, 18, include a grounded, flat conducting back plate, 20, a flat dielectric plate, 22, grounded elongated electrode, 24, electrically connected to ground plate, 20, and elongated high voltage electrode, 26. Electrical feedthrough, 28, which is in electrical contact with low-inductance, high voltage supply, 30, permits high voltage electrode, 26, to rest with some tension on dielectric plate, 22. Similarly, for ground electrode, 24, which may be positioned such that it rests on dielectric plate, 22, with some tension. Thus, both electrodes are in contact with the dielectric plate, and provide a force which presses dielectric plate, 22, against ground plate, 20. Ground electrode, 24, is provided with a slot, 31, such that a chosen gas may be passed over dielectric plate, 22, by means of blower, 32. After passing over dielectric plate, 22, the gas, 38, may pass under ground plate, 20, through cooling towers, 34 and 36, and back through blower, 32. Such an arrangement permits the gas to be cooled between excitation pulses. Grounding strap, 40, permits ground plate, 20, to be grounded to support, 42, of surface discharge light source, 18. As will be seen in FIG. 2 hereof, dielectric plate, 22, is then free to expand essentially freely in three directions, the juncture, 44, of the ground plate and the ground electrode limiting its movement in one direction. This motion is necessary to prevent breakage of the generally brittle dielectric materials. It should also be mentioned that dielectric plate, 22, extends well past the overlap between high voltage electrode, 26, and ground plate, 20, in order to reduce the possibility of arcing therebetween. In actual operation, a high voltage is applied to electrode, 26, and a flat, uniform gas discharge takes place along dielectric plate, 22, thereby generating substantial ultraviolet radiation, which may be utilized to process materials, 46, in its path. It should be mentioned that the long dimensions of the grounded and high-voltage electrodes are parallel. The choice of ultraclean dielectric materials permits material, 46, to be irradiated in the same chamber as the surface discharge light source of the present invention.

Figure 2:
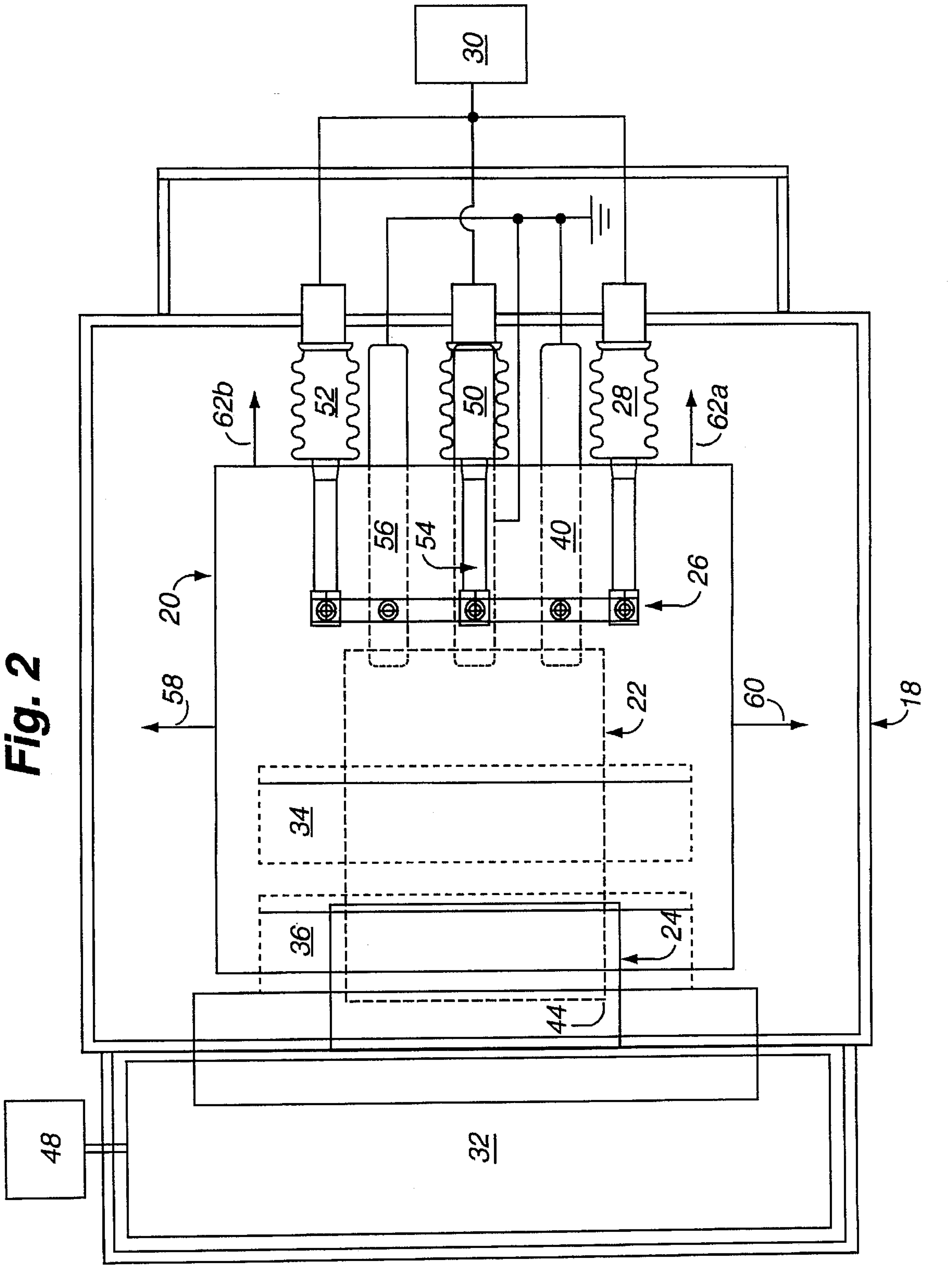
FIG. 2 is a schematic representation of the top view of the present apparatus shown in FIG. 1.

FIG. 2, hereof is a schematic representation of the top view of the present apparatus shown in FIG. 1. Shown are motor, 48, which turns blower, 32, forcing the chosen gas over dielectric plate, 22, that the high voltage is supplied to electrode, 26, by electrical feedthroughs, 28, 50, and 52, and that ground plate, 20, is grounded by grounding straps, 40, 54, and 56. Arrows, 58, 60, 62*a*, and 62*b*, illustrate the directions that dielectric plate, 22, may expand essentially unencumbered.

Figure 3:
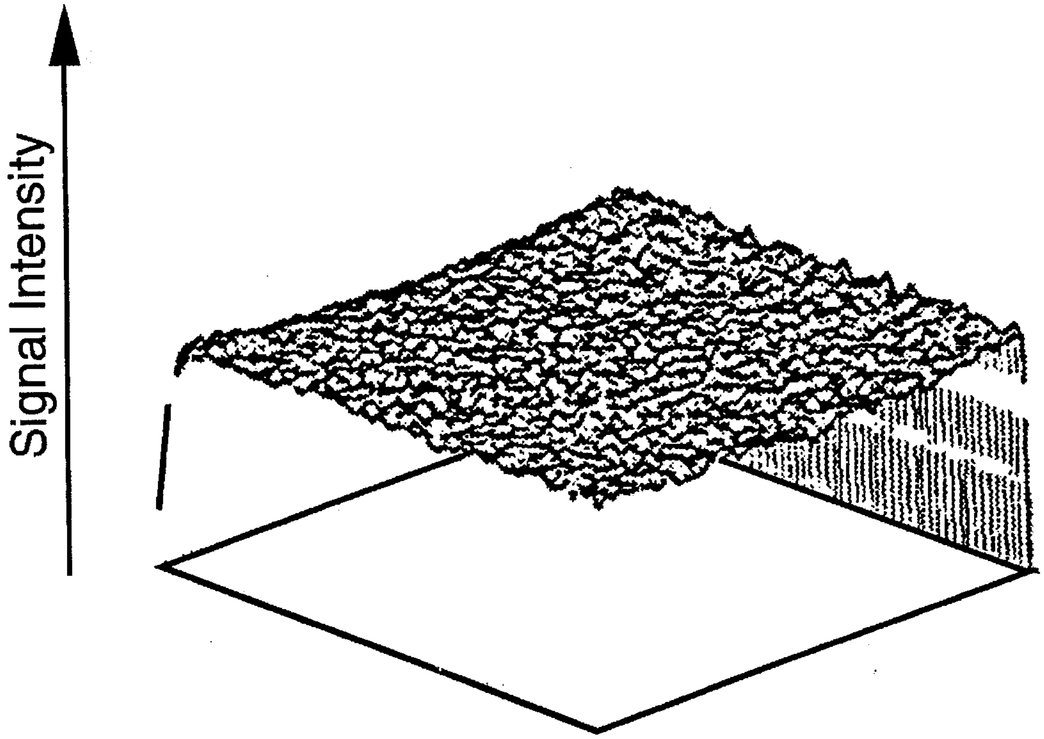
FIG. 3 illustrates a three-dimensional display of the surface intensity of the light generated by the surface discharge light source of the invention.

In one embodiment of the present invention, the surface discharge area was 15 cm ×15 cm, yielding a 225 $cm^2$ emission area driven by three, parallel charge-transfer circuits (28, 50, and 52). The total capacitance of the circuits was 4.2 μF. The reactor was filled with 500 torr of argon. With a charging voltage of 30 kV, a 1.5-μs-long (one-half cycle of a sine wave) current pulse having a peak of about 70 kA per circuit was measured. The total stored energy in the main capacitors (not shown) was 1.9 kJ, and the inductance of each circuit was less than 200 nH. This energy was deposited onto alumina ($Al_2O_3$) and onto glass dielectric plates. Visible emission from the surface discharge was found to be intense and uniform over the 15 cm×15 cm emission area, as may be observed in FIG. 3 (attenuated by a factor of about one million), hereof, which illustrates a three-dimensional display of the surface intensity detected using a charge-coupled detector. Light uniformity at the surface of the discharge was found to be better than 5%. Of importance, is that the discharge area is limited principally by the high-voltage pulse generator.

The foregoing description of the invention has been presented for purposes of illustration and description and is not intended to be exhaustive or to limit the invention to the precise form disclosed, and obviously many modifications and variations are possible in light of the above teaching. Clearly, it would be apparent to one having ordinary skill in the art after studying the present disclosure, that virtually any chemically stable dielectric material could be substituted for alumina or glass as a dielectric plate. Moreover, it is anticipated that there will be advantages to dielectric surfaces having other than planar geometry. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A large-area, surface discharge light source, which comprises in combination:

a. a substantially flat, conducting back plate having at least one, approximately straight edge;

b. a flat dielectric plate having two substantially flat and parallel sides, one side being in contact with said back plate;

c. an elongated ground electrode, in electrical contact with said back plate, located on the side of the dielectric plate away from said back plate, and having the long dimension thereof substantially parallel to a straight edge of said back plate;

d. an elongated high voltage electrode located on the same side of said dielectric plate as said ground electrode and spaced apart therefrom, with the long dimension of said high voltage electrode being parallel to the long dimension of said ground electrode;

e. means for pressing said ground electrode against the surface of said dielectric plate;

f. means for pressing said high voltage electrode against the surface of said dielectric plate;

g. means for applying a high voltage pulse to said high voltage electrode; and h. gas-tight enclosure means for admitting a chosen gas at a chosen pressure in the region of said dielectric plate between said ground electrode and said high voltage electrode; whereby said dielectric plate is slidably pressed against the back plate by the force generated by said means for pressing said ground electrode and said means for pressing said high voltage electrode against the surface of said dielectric plate, and whereby a uniform electric discharge takes place over the surface of said dielectric plate between said high voltage electrode and said ground electrode, thereby generating intense ultraviolet radiation.

2. The large-area, surface discharge light source as described in claim 1, wherein said dielectric plate is made of alumina.

3. The large-area, surface discharge light source as described in claim 1, wherein said dielectric plate is made of glass.

4. The large-area, surface discharge light source as described in claim 1, further comprising means for circulating the chosen gas over the side of said dielectric plate away from said back plate between said ground electrode and said high voltage electrode, and means for cooling the circulated gas.

5. The large-area, surface discharge light source as described in claim 1, further comprising means for holding material to be irradiated by said surface discharge light source at a chosen distance from said dielectric plate within said enclosure means.

6. An apparatus for photolytically processing semiconductor and flat panel display materials, which comprises in combination:

a. a substantially flat, conducting back plate having at least one, approximately straight edge;

b. a flat dielectric plate having two substantially flat and parallel sides, one side being in contact with said back plate;

c. an elongated ground electrode, in electrical contact with said back plate, located on the side of the dielectric plate away from said back plate, and having the long dimension thereof substantially parallel to a straight edge of said back plate;

d. an elongated high voltage electrode located on the same side of said dielectric plate as said ground electrode and spaced apart therefrom, with the long dimension of said high voltage electrode being parallel to the long dimension of said ground electrode;

e. means for pressing said ground electrode against the surface of said dielectric plate;

f. means for pressing said high voltage electrode against the surface of said dielectric plate;

g. means for applying a high voltage pulse to said high voltage electrode; and h. gas-tight enclosure means for admitting a chosen gas at a chosen pressure in the region of said dielectric plate between said ground electrode and said high voltage electrode, and adapted for receiving the materials to be processed; whereby said dielectric plate is slidably pressed against the back plate by the force generated by said means for pressing said ground electrode and said means for pressing said high voltage electrode against the surface of said dielectric plate, and whereby a uniform electric discharge takes place over the surface of said dielectric plate between said high voltage electrode and said ground electrode, thereby generating intense ultraviolet radiation which is incident on the materials to be processed.

7. The apparatus for photolytically processing semiconductor and flat panel display materials as described in claim 6, wherein said dielectric plate is made of alumina.

8. The apparatus for photolytically processing semiconductor and flat panel display materials as described in claim 6, wherein said dielectric plate is made of glass.

9. The apparatus for photolytically processing semiconductor and flat panel display materials as described in claim 6, further comprising means for circulating the chosen gas over the side of said dielectric plate away from said back plate between said ground electrode and said high voltage electrode, and means for cooling the circulated gas.

10. The apparatus for photolytically processing semiconductor and flat panel display materials as described in claim 6, further comprising means for holding material to be irradiated by said surface discharge light source at a chosen distance from said dielectric plate within said enclosure means.

* * * * *